(12) United States Patent
Monika et al.

(10) Patent No.: US 12,252,397 B2
(45) Date of Patent: Mar. 18, 2025

(54) PROCESS FOR THE SYNTHESIS OF NANOPARTICLES OF TRANSITION METAL CHALCOGENIDES

(71) Applicant: Council of Scientific & Industrial Research, New Delhi (IN)

(72) Inventors: Monika Monika, Pune Maharashtra (IN); Pankaj Poddar, Pune Maharashtra (IN)

(73) Assignee: Council of Scientific & Industrial Research, New Delhi (IN)

( * ) Notice: Subject to any disclaimer, the term of this patent is extended or adjusted under 35 U.S.C. 154(b) by 706 days.

(21) Appl. No.: 17/594,865

(22) PCT Filed: Apr. 21, 2020

(86) PCT No.: PCT/IN2020/050374
§ 371 (c)(1),
(2) Date: Nov. 1, 2021

(87) PCT Pub. No.: WO2020/222249
PCT Pub. Date: Nov. 5, 2020

(65) Prior Publication Data
US 2022/0194795 A1   Jun. 23, 2022

(30) Foreign Application Priority Data
May 2, 2019   (IN) .............................. 201911017480

(51) Int. Cl.
*C01B 19/00*   (2006.01)

(52) U.S. Cl.
CPC ........ *C01B 19/007* (2013.01); *C01P 2004/62* (2013.01); *C01P 2004/64* (2013.01)

(58) Field of Classification Search
CPC ...... C01B 19/007; C01G 49/12; C01G 37/00; C01G 45/00; C01G 51/30; C01G 53/11; C01P 2004/62; C01P 2004/64
See application file for complete search history.

(56) References Cited

U.S. PATENT DOCUMENTS

2007/0111319 A1   5/2007   Bastide et al.
2016/0280543 A1*  9/2016   Lee ........................ C01B 19/007

FOREIGN PATENT DOCUMENTS

| EP | 1 874 686 B1 | 1/2008 | |
| TW | 2019-05231 A | 2/2019 | |
| WO | WO-2017085741 A1 * | 5/2017 | ........... C01B 19/007 |

OTHER PUBLICATIONS

Li, S. J., et al. "Growth process and magnetic properties of α-FeSe nanostructures." Journal of Applied Physics 115.17 (2014).*

(Continued)

*Primary Examiner* — Richard M Rump
(74) *Attorney, Agent, or Firm* — Knobbe, Martens, Olson & Bear, LLP (57) ABSTRACT

A process for the synthesis of transition metal chalcogenides (TMC) having formula (I). More particularly, the present work relates to a one pot single phase process for the synthesis of a TMC system having formula (I) by wet chemistry. Formula (I) is represented as $A_x$-$B_y$.

9 Claims, 12 Drawing Sheets

(56) References Cited

OTHER PUBLICATIONS

Yadav, Sushma, et al. "Nickel selenide nanoparticles as a cheap alternative for Pt-counter electrode in dye-sensitized solar cells." Journal of Nanoscience and Nanotechnology 19.1 (2019): 375-382.*
Chen, Liqiao, et al. "Composition and size tailored synthesis of iron selenide nanoflakes." CrystEngComm 12.12 (2010): 4386-4391.*
Lyubutin, I. S., et al. "Structural, magnetic, and electronic properties of iron selenide Fe6—7Se8 nanoparticles obtained by thermal decomposition in high-temperature organic solvents." The Journal of chemical physics 141.4 (2014).*
Altavilla, Claudia et al., "A Novel Wet Chemistry Approach for the Synthesis of Hybrid 2D Free-Floating Single or Multilayer Nanosheets of $MS_2$@oleylamine (M=Mo, W)", American Chemical Society, Chem. Mater. 2011, 23, 3879-3885.
Han, Chao, "Synthesis of nanostructured metal chalcogenides used for energy conversion and storage", Doctor of Philosophy thesis, Institute for Superconducting and Electronic Materials, University of Wollongong, 2015. On the internet at: ro.uow.edu.au/theses/4602 (in 287 pages).
Shanmugaratnam, Sivagowri et al., "Transition Metal Chalcogenide (TMC) Nanocomposites for Environmental Remediation Application over Extended Solar Irradiation", *Nanocatalysts*, 2019 (in 23 pages).
International Search Report and Written Opinion in International Patent Application No. PCT/IN2020/050374 issued Aug. 21, 2020.
Grivel, J-C, et al., "In situ observation of the formation of FeSe", Supercond. Sci. Technol. 24 (2011) 015007.

* cited by examiner

PROCESS FOR THE SYNTHESIS OF NANOPARTICLES OF TRANSITION METAL CHALCOGENIDES

FIELD OF THE INVENTION

The present invention relates to a process for the synthesis of transition metal chalcogenides (TMC) having formula (I). More particularly, the present work relates to a one-pot single phase process for the synthesis of TMC system having formula (I) by wet chemistry.

BACKGROUND AND PRIOR ART OF THE INVENTION

Transition-metal chalcogenides represent an important class of materials with rich phase diagram and industrial applications. The electronic (optical, magnetic, and electrical) and thermal properties are so sensitive to the crystalline phase, stoichiometry, shape, size that it is essential to reach a good control over the chemistry of phase formation. TMC consisting of metal atoms (Fe, Co, and Ni) and chalcogen atoms (S, Se, Te) have renewed interest as very attractive candidates for applications in devices including fuel-cells, solar-cells, light-emitting-diodes, sensors, memory-devices, thermoelectric devices, supercapacitors, Li-ion batteries, magnetic materials etc. Among the TMC, $Fe_xSe_y$ compounds (with x: y varying from 1:2 to 1:1) are of great importance because of their interesting and unique magnetic, electrical, thermal, and optical properties which are strongly related on the stoichiometric ratio between Fe and Se as well as their crystalline structure. Family of iron selenides have four stable phases: $FeSe_2$, $Fe_3Se_4$, $Fe_7Se_8$, and FeSe having orthorhombic (O) marcasite, monoclinic (M) and hexagonal (H) NiAs type, and tetragonal (T) PbO type crystal structure, respectively. Existence of multiple phases with abundantly different crystal structures indicates the complexity of the system and therefore, phase-selective syntheses were quite challenging for this system. In solid state method, as reported by Grivel et al. (Supercond. Sci. Technol. 24 (2011) 015007) there was phase transformation of Fe—Se system with respect to temperature in a sequence of $FeSe_2 \rightarrow Fe_3Se_4 \rightarrow Fe_7Se_8$—β-FeSe at 300° C., 320° C., ~340° C., 350° C.-370° C., respectively. In this article the phase boundaries were not sharply defined as a function of temperature. Often at a particular temperature, phases evolved out of the other phases leading to overall impurity.

Numerous solution processes have been applied to synthesize these compounds. For example, $Fe_3Se_4$ and $Fe_7Se_8$ nanoparticles (NPs) were obtained via the thermal decomposition method at 340° C.-350° C., $Fe_3Se_4$ were synthesized at 300° C. by one-pot high-temperature organic-solution-phase method, flower-like $FeSe_2$ NPs were synthesized via a solvothermal approach at 200° C., $FeSe_x$ (x=1,2) NPs were synthesized via the hot-injection method at 330° C. and $FeSe_2$ NPs were synthesized via hydrothermal method at 140° C. for 13 h. The FeSe NPs were synthesized by solvothermal reaction in an autoclave at 220° C. for 24 h. These methods involved the high temperature, long reaction time, complex apparatus, expensive chemicals, or drastic conditions to synthesis the Fe—Se NPs.

Thus, adopting a simple, low-temperature, short-time, and low-cost method with well-defined shape and high crystallinity of Fe—Se NPs is much desired. To overcome the prior drawbacks the present invention provides a one pot single phase process for the synthesis of transition metal chalcogenides (TMC) system having formula I.

OBJECTIVES OF THE INVENTION

The objective of the present invention is to provide a one pot single phase process for the synthesis of transition metal chalcogenides (TMC) having formula (I).

SUMMARY OF THE INVENTION

Accordingly, the present invention provides a one pot single phase process for the synthesis of transition metal chalcogenides (TMC) system having formula (I) by using wet chemistry. This method comprises mixing both precursors of transition metal and chalcogen in the presence of a reducing agent and an accelerating agent at a temperature in the range of 100° C. to 300° C. for a time period varied from 30 min to 10 h to obtain transition metal chalcogenides (TMC) having formula (I).

The transition metal chalcogenides (TMC) system having formula (I) is represented as $A_x$-$B_y$,   Formula (I)

wherein,
A is selected from iron, chromium, manganese, cobalt, or nickel.
B is selected from selenium, sulphur, or tellurium.
The $A_x$-$B_y$ is selected from $AB_2$, $A_3B_4$, $A_7B_8$ or AB,
wherein x and y are in ranges from 1:2 to 1:1.

DETAILED DESCRIPTION OF THE INVENTION

The invention will now be described in detail in connection with certain preferred and optional embodiments, so that various aspects thereof may be more fully understood and appreciated.

The present invention provides a one-pot single phase process for the synthesis of a transition metal chalcogenide (TMC) nanoparticles (NPs) system having formula (I) by using wet chemical method, the process comprising mixing and stirring both a transition metal precursor and a chalcogen precursor in the presence of a reducing agent and an accelerating agent and stirring at a temperature in the range of 100° C. to 300° C. for a time period varied from 30 min to 10 h to obtain the TMC NPs system having formula (I). The TMC NPs system having formula (I) is represented as $A_x\text{-}B_y$  Formula (I)

wherein,

A is selected from the group consisting of iron, chromium, manganese, cobalt, and nickel;

B is selected from the group consisting of selenium, sulphur, and tellurium; $A_x\text{-}B_y$ is selected from $AB_2$, $A_3B_4$, $A_7B_8$ and $AB$;

wherein the ratio of x and y are in ranges from 1:2 to 1:1.

The system of formula (I) is selected from $FeSe_2$, $Fe_3Se_4$, $Fe_7Se_8$, $FeSe$, $Co_3Se_4$, $Ni_3Se_4$ and $MnSe$.

The size of as-synthesized TMC NPs are in the range of 5 nm to 350 nm. The shape of as-synthesized TMC NPs is selected from nano-rod, nano-sphere, nano-sheet, nano-platelet, nano-cube, and mixed shape.

Any organic solvent, which has the ability to make complex with transition metal (Fe) and chalcogen (Se) precursors, and simultaneously reduce them can be used as a reducing agent for TMC system. Moreover, any organic solvent can use as an accelerating agent which have the ability to make complex with chalcogen (Se powder). The particular temperature required for pure phase formation will strongly depends on the organic solvent. As going towards the stronger reducing and accelerating agent, the temperature and time for that particular phase changes.

The reducing agent is selected from oleylamine (OLA), oleic acid, 1-octadecene (1-ODE), octadecylamine, oleyl alcohol, pentylamine, ethylamine and n-octadecane. The accelerating agent is selected from 1-octadecene, oleic acid, oleylamine, octadecylamine, oleyl alcohol, pentylamine, and ethylamine.

The transition metal precursor is selected from Tris(acetylacetonato) iron (III) ($Fe(acac)_3$), Cobalt(III) acetylacetonate, Nickel(II) acetylacetonate and Manganese(III)acetylacetonate.

The chalcogen precursor is Se powder.

In one of the features, the present invention provides a one pot single phase process for the synthesis of transition metal chalcogenides (TMC) nanoparticles system particularly Fe—Se system comprising the steps of:
  a) mixing Se powder and $Fe(acac)_3$ at room temperature (25° C. to 30° C.) in the presence of an organic solvent under the blanket of inert gas with constant magnetic stirring;
  b) raising the temperature to 40° C. followed by stirring for 30 min and taking the first sample of only Se powder;
  c) further increasing the temperature to 50° C. followed by stirring for 30 min and taking the second sample of only Se powder and
  d) increasing the temperature up to 340° C. with the rate of 10° C./30 min and taking the sample at every 10° C. rise in temperature, as the temperature increases, $FeSe_2$ starts forming followed by $Fe_3Se_4$, $Fe_7Se_8$ and FeSe.

In each step 2 mL aliquots are withdrawn using a long needle-glass syringe. All the samples are stored in small glass vials and naturally quenched to room temperature (RT) for further investigation.

In another feature of the present invention, the organic solvent is selected from oleylamine (OLA); oleylamine & 1-octadecene (OLA & 1-ODE) and oleylamine (OLA) & pre-dissolved Se powder in 1-octadecene (1-ODE).

Three separate reactions are carried out with above procedure except the solvent conditions; in one reaction only OLA has been used as a solvent, in second reaction a combination of OLA and 1-ODE (in 3:2 ratio) has been used as a solvent; and in the last reaction Se powder was pre-dissolved in 1-ODE and used that as a Se precursor with OLA and $Fe(acac)_3$.

Figure 1:
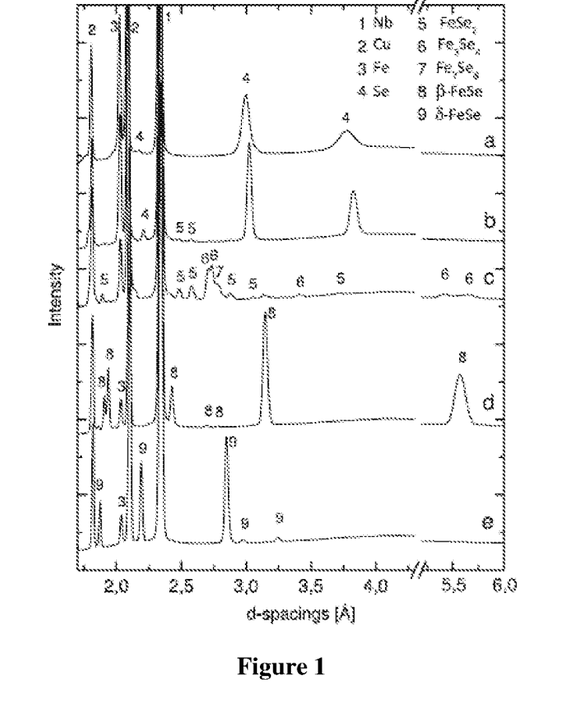
FIG. 1: Powder X-ray diffraction patterns collected at various temperatures during the heating ramp a. 25° C. b. 190° C. c. 360° C. d. 394° C. and e. 486° C. for prior art.

FIG. 1 depicts diffraction patterns collected at various temperatures during the heating ramp for prior art. The phase boundaries were not sharply defined as a function of temperature. Often at a particular temperature, phases evolved out of the other phases leading to overall impurity.

Figure 2:
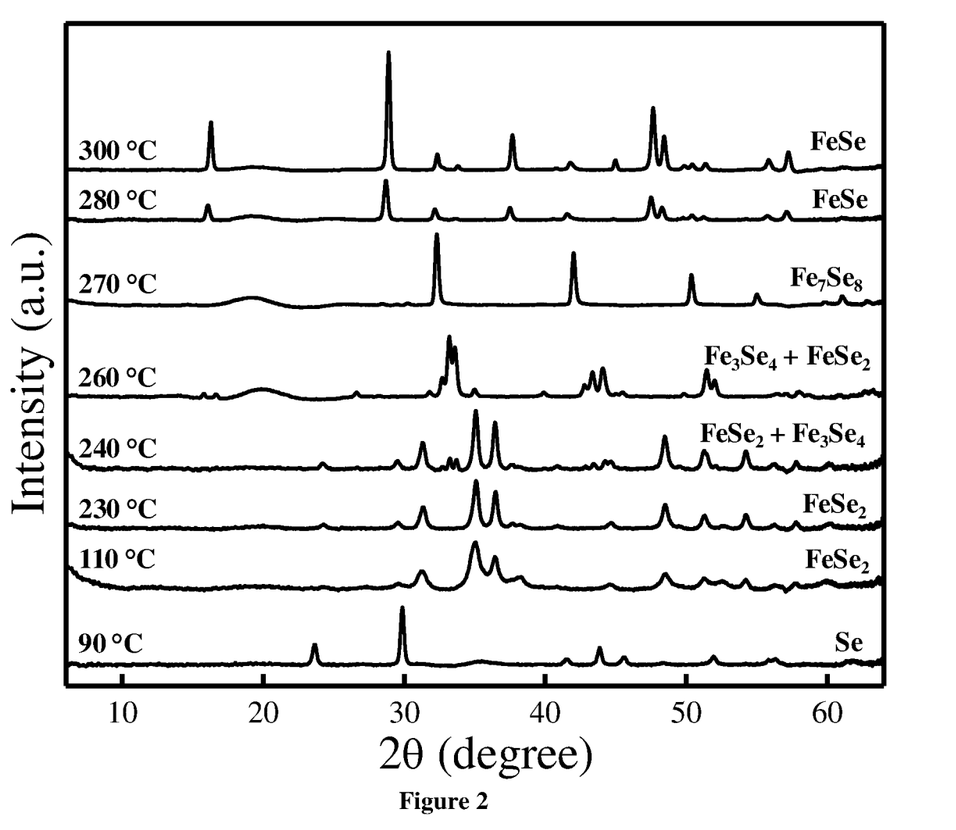
FIG. 2: Powder X-ray diffraction patterns collected at various temperatures during the heating ramp for present invention.

FIG. 2 depicts diffraction patterns collected at various temperatures during the heating ramp for present invention. Phase boundaries were mostly sharply defined and well isolated as a function of temperatures and phase impurities were avoided. The diffraction pattern shows the phase evolution from $FeSe_2$ to $Fe_3Se_4$ followed by $Fe_7Se_8$ and FeSe.

TABLE 1

Results of diffraction patterns collected at various temperatures during the heating ramp.

| Reaction | Fe Precursor | Se precursor | Solvent | Temperature-range | Phase |
|---|---|---|---|---|---|
| A | $Fe(acac)_3$ | Se powder | OLA | RT-100° C. | Se |
|   |   |   |   | 110-130° C. | Se + $FeSe_2$ |
|   |   |   |   | 140-220° C. | $FeSe_2$ |
|   |   |   |   | 230-240° C. | $FeSe_2$ + $Fe_3Se_4$ |
|   |   |   |   | 250-270° C. | $Fe_3Se_4$ |
|   |   |   |   | 280-340° C. | $Fe_7Se_8$ |
| B | $Fe(acac)_3$ | Se powder (Se was pre-dissolved in 1-ODE at 30° C. for 6 h) | OLA + 1-ODE | RT-100° C. | Se |
|   |   |   |   | 110-230° C. | $FeSe_2$ |
|   |   |   |   | 240-250° C. | $FeSe_2$ + $Fe_3Se_4$ |
|   |   |   |   | 260° C. | $Fe_3Se_4$ + $FeSe_2$ |
|   |   |   |   | 270° C. | $Fe_7Se_8$ |
|   |   |   |   | 280-300° C. | FeSe |

Figure 3:
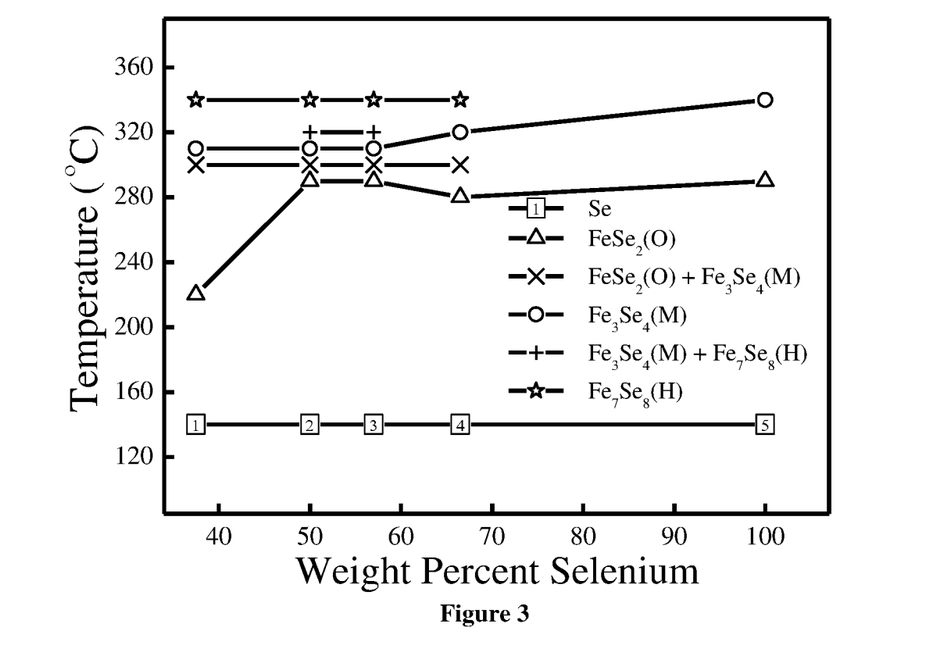
FIG. 3: Iron-Selenium phase diagram.

FIG. 3 depicts Iron-Selenium phase diagram. Phases 1 to 5 show the results of five prolonged reactions. The experiments were done by varying the amount of Se from 37.5 to 100 at % with constant Fe precursor in presence of OLA and 1-ODE together from RT to 340° C. The phase transformation has been confirmed by doing the WAXS (wide angle X-ray scattering) of all the samples, taken at every 10° C. rise in temperature from 30° C.-340° C. and the data are compared with the JCPDS files to conform the phases.

TABLE 2

Results of phases formed at minimal possible temperature with pertinent time.

| Phases | Solvent | Ramping Rate | Temp. | Time | Remarks |
|---|---|---|---|---|---|
| $FeSe_2$ | OLA | 2° C. min$^{-1}$ | 150° C. | 2 h | Single phase $FeSe_2$ NPs |
| $Fe_3Se_4$ | OLA | 2° C. min$^{-1}$ | 230° C. | 8 h | $Fe_3Se_4$ + $FeSe_2$ (impurity phase) |
| | | 2° C. min$^{-1}$ | 240° C. | 6 h | |
| | | 2° C. min$^{-1}$ | 250° C. | 5 h | |
| | | 120° C.-0.5 h + 2° C. min$^{-1}$ up to 200° C. + 2° C. min$^{-1}$ up to 250° C. | 250° C. | 4 h | $Fe_3Se_4$ + $FeSe_2$ (impurity phase) |
| | | 2° C. min$^{-1}$ | 260° C. | 5 h | |
| | | 120° C.-0.5 h + 2° C. min$^{-1}$ up to 200° C. + 2° C. min$^{-1}$ up to 250° C. | 260° C. | 2 h | Single phase $Fe_3Se_4$ NPs |
| $Fe_7Se_8$ | OLA | 2° C. min$^{-1}$ | 270° C. | 4 h | $Fe_3Se_4$ + $FeSe_2$ (impurity phase) |
| | | 5° C. min$^{-1}$ up to 230° C. + 2° C. min$^{-1}$ up to 270° C. | 270° C. | 4 h | $Fe_7Se_8$ + $Fe_3Se_4$ (impurity phase) |
| | | 2° C. min$^{-1}$ | 280° C. | 4 h, 5 h | |
| | | 5° C. min$^{-1}$ up to 230° C. + 2° C. min$^{-1}$ up to 280° C. | 280° C. | 4 h | Single phase $Fe_7Se_8$ NPs |
| | OLA | 5° C. min$^{-1}$ up to 230° C. + 2° C. min$^{-1}$ up to 280° C. | 280° C. | 4 h | $Fe_7Se_8$ |
| | OLA + 1-ODE | 5° C. min$^{-1}$ up to 230° C. + 2° C. min$^{-1}$ up to 280° C. | 280° C. | 4 h | FeSe + $Fe_7Se_8$ (impurity phase) |
| | OLA + 1-ODE | 5° C. min$^{-1}$ up to 230° C. + 2° C. min$^{-1}$ up to 280° C. | 280° C. | 4 h | Single phase FeSe NPs (Se powder was pre-dissolved in 1-ODE) |

Figure 4:
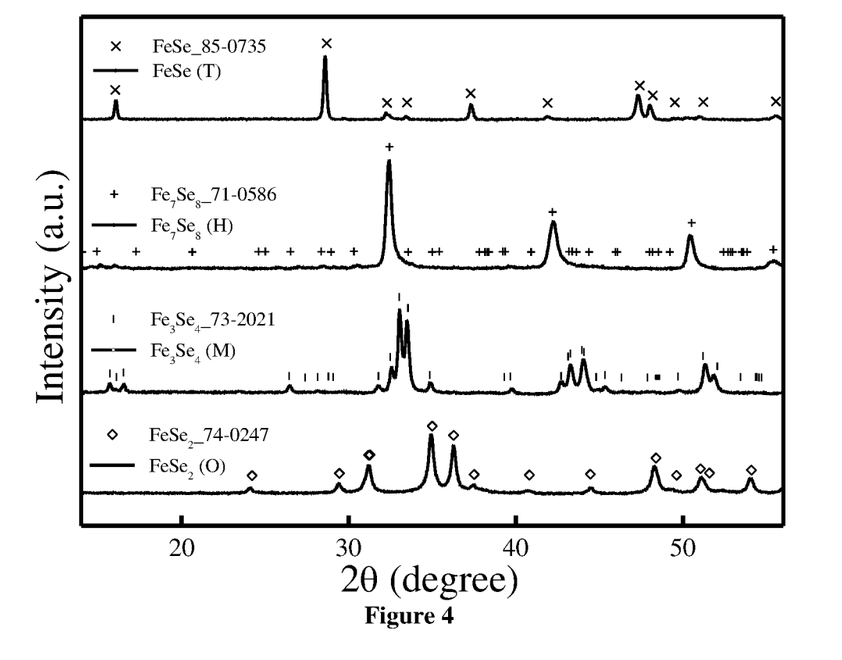
FIG. 4: XRD patterns of the as-synthesized a) $FeSe_2$ NPs, b) $Fe_3Se_4$ NPs, c) $Fe_7Se_8$ NPs and d) FeSe NPs.

FIG. 4 depicts XRD patterns of the as-synthesized a) $FeSe_2$ NPs, b) $Fe_3Se_4$ NPs, c) $Fe_7Se_8$ NPs, and d) FeSe NPs. All the XRD peaks are in good agreement with the JCPDS (Joint Committee on Powder Diffraction Standards) data files—(74-0247) for $FeSe_2$, (73-2021) for $Fe_3Se_4$, (71-0586) for $Fe_7Se_8$ and (85-0735) for FeSe without ambiguous reflections. The XRD and magnetic measurements prove the high purity of as-synthesized NPs. Crystallite size of $FeSe_2$=23 nm, $Fe_3Se_4$=35 nm, $Fe_7Se_8$=29 nm, FeSe=46 nm as estimated from the XRD pattern using Scherrer's formula.

Figure 5:
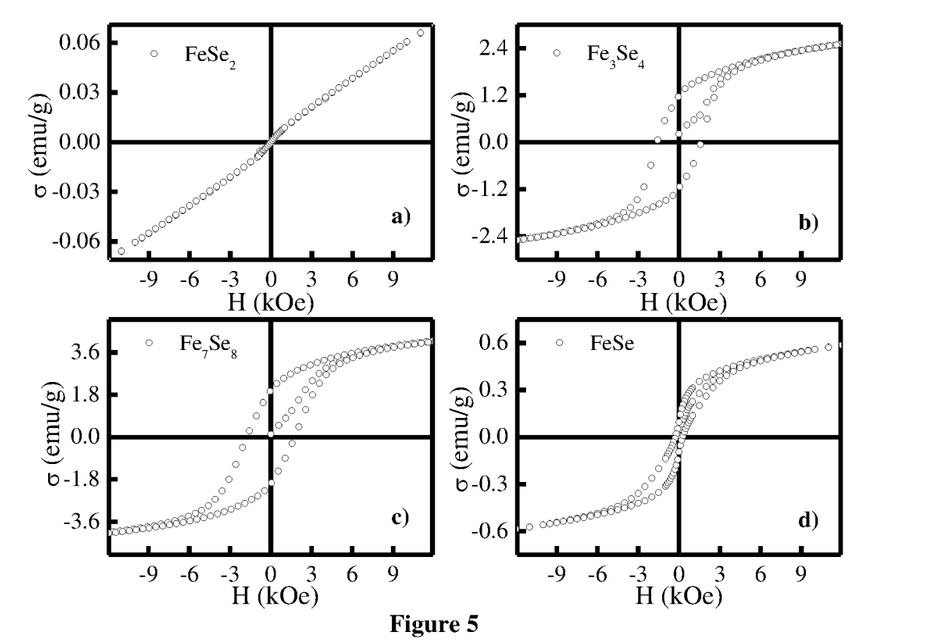
FIG. 5: Magnetization (M) vs. applied magnetic field (H) hysteresis loops of a) $FeSe_2$ b) $Fe_3Se_4$ c) $Fe_7Se_8$ and d) FeSe measured by the vibrating sample magnetometer at 300 K.

FIG. 5 depicts magnetization (M) vs. magnetic field (H) hysteresis loops of a) $FeSe_2$ b) $Fe_3Se_4$ c) $Fe_7Se_8$ and d) FeSe measured by the vibrating sample magnetometer at 300 K in an applied magnetic field up to ±60 kOe. The M-H curves reveal prominent M-H characteristics indicating the synthesis of pure phase. Figure a) shows the M-H curve of $FeSe_2$ NPs revealing paramagnetic behavior with coercivity ($H_c$) 146 Oe. Figure b-c) shows the M-H curves of $Fe_3Se_4$ and $Fe_7Se_8$ NPs having ferrimagnetic behavior. These hysteresis loops show the coercivity 1.6 kOe and 1.8 kOe, respectively. In Figure d) the hysteresis loop of FeSe reveals ferromagnetic nature of NPs having coercivity ($H_c$) 282 Oe.

Figure 6:
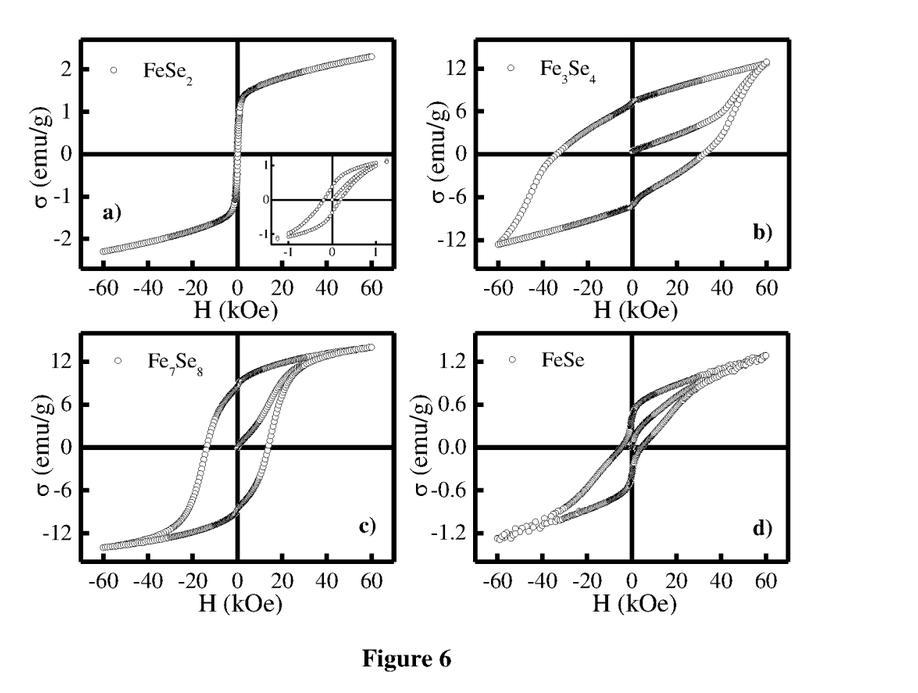
FIG. 6: Magnetization (M) vs. applied magnetic field (H) hysteresis loops of a) $FeSe_2$ b) $Fe_3Se_4$ c) $Fe_7Se_8$ and d) FeSe measured by the vibrating sample magnetometer at 10 K.

FIG. 6 depicts M-H hysteresis loops of a) $FeSe_2$ b) $Fe_3Se_4$ c) $Fe_7Se_8$ and d) FeSe measured by the vibrating sample magnetometer at 10 K. The coercivity ($H_c$) of $FeSe_2$ NPs rises to 200 Oe with ferromagnetic behavior. The $H_c$ value of $Fe_3Se_4$ nanorods raises nearly 20-fold to about 32 kOe. The value of $Fe_7Se_8$ nanorods rises more than 7-fold to about 13.8 kOe. The coercivity ($H_c$) of FeSe nanorods increases to about 4.4 kOe.

TABLE 3

Magnetic parameters measured at 300K and 10K for Fe—Se system. $H_c$ and $\sigma_R$ represents the coercivity and remanence respectively obtained from hysteresis loops at various temperature.

| | $H_c$ (Oe) | | $\sigma_R$ (emu/g) | |
|---|---|---|---|---|
| Phases | 300K | 10K | 300K | 10K |
| $FeSe_2$ | 146 | 200 | ~0 | 0.4 |
| $Fe_3Se_4$ | 1600 | 32000 | 1.2 | 7.3 |
| $Fe_7Se_8$ | 1800 | 13800 | 2 | 8.6 |
| FeSe | 300 | 4400 | 0.1 | 0.4 |

Figure 7:
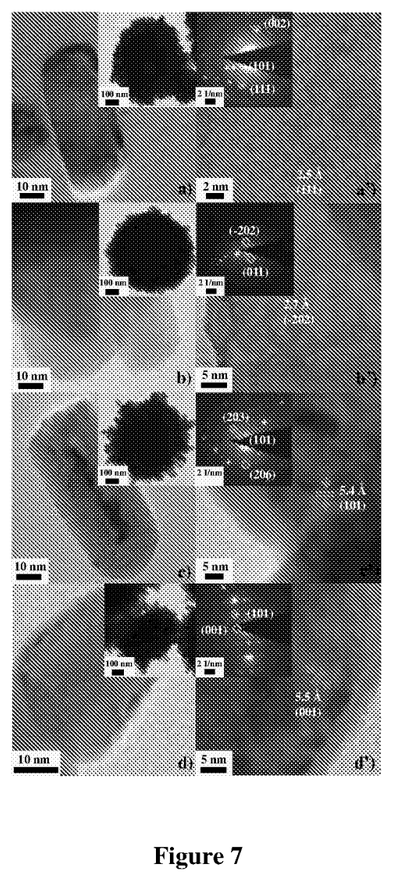
FIG. 7: TEM measurements of as-synthesized NPs.

FIG. 7 shows TEM measurements of as-synthesized NPs. Typical TEM images of as-synthesized a)$FeSe_2$, b)$Fe_3Se_4$, c)$Fe_7Se_8$ and d)FeSe NPs shows the rod like features and inset shows the iron selenide nanocacti with rod like features growing on the surface [Scale bar in the insets are 100 nm]. a') to d') shows the lattice fringes space at 2.5 Å, 2.7 Å, 5.4 Å and 5.5 Å represents the (111), (−202), (101) and (001) of Fe—Se system respectively [The inset SAED pattern]. The diffraction pattern obtained for all the nanostructures were matched well with the crystal planes of Fe—Se system and have been assigned to (002), (101), (111) planes for $FeSe_2$, (−202), (011) planes for $Fe_3Se_4$, (203), (101), (206) planes for $Fe_7Se_8$ and (001), (101) planes for FeSe. Thus, d-spacing calculated in TEM are in good agreement with those given in the standard JCPDS for all the phases of Fe—Se system.

Figure 8:
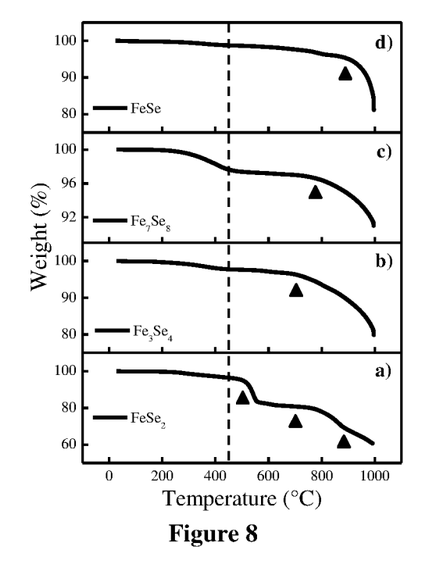
FIG. 8: Thermal Gravimetric Analysis (TGA).

FIG. 8 shows Thermal Gravimetric Analysis (TGA). All the samples were undergone with different step decomposition. The first step in all samples is related to the loss of all organic fragments capped on NPs, this step was up to 460° C. The $FeSe_2$ NPs further go through three more step decomposition. The steps assigned to the decomposition of $FeSe_2$ NPs to $Fe_3Se_4$; $Fe_3Se_4$ NPs to the $Fe_7Se_8$ followed by the conversion of $Fe_7Se_8$ to FeSe and final step, the decomposition of FeSe NPs started at 875° C. and remains up to 1000° C. The $Fe_3Se_4$ NPs further go through final step, assigned to the decomposition of $Fe_3Se_4$ started at 725° C. and gradually decreases up to 1000° C. The $Fe_7Se_8$ NPs go through final step, assigned to the decomposition of $Fe_7Se_8$ started at 770° C. and gradually decreases up to 1000° C. The FeSe NPs go through final step assigned to the decomposition of FeSe started at 875° C. and gradually decreases up to 1000° C.

Figure 9:
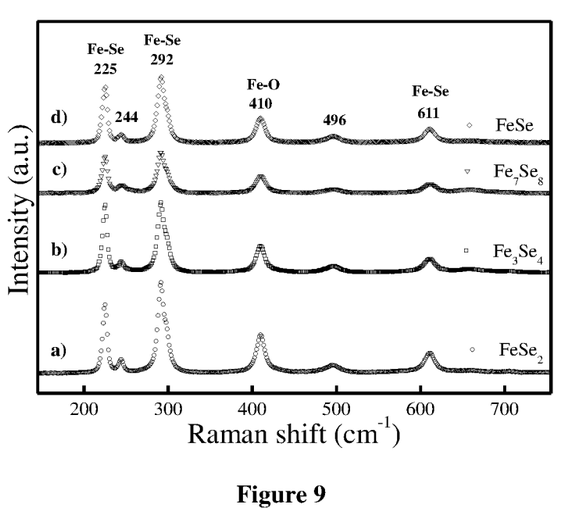
FIG. 9: Raman spectra.

FIG. 9 shows Raman Spectra of all the samples having six characteristic peaks at 225, 244, 292, 410, 496, and 611 $cm^{-1}$. The presences of Fe—Se near 225 $cm^{-1}$, 292 $cm^{-1}$ and 610 $cm^{-1}$, as well as Fe—O at 410 $cm^{-1}$ are identified for all the samples.

Figure 10:
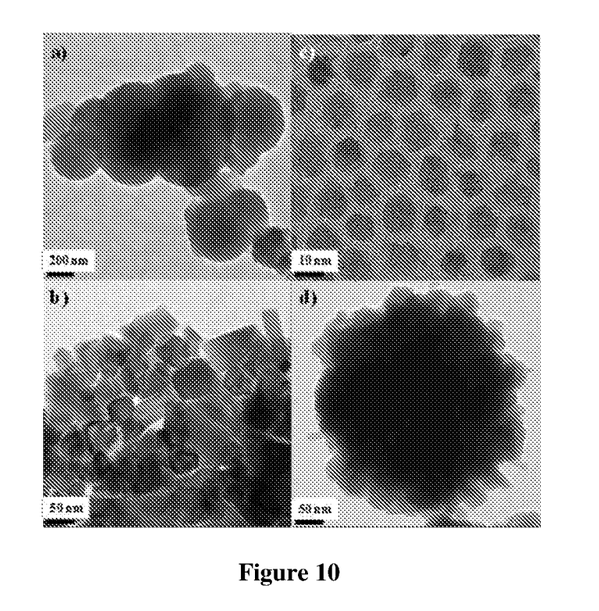
FIG. 10: TEM images of as-synthesized NPs with different organic solvents.

FIG. 10 shows TEM images of as-synthesized NPs in the presence of different organic solvents a) n-octadecane, b) 1-octadecene, c) octadecylamine and d) oleylamine. TEM data shows the strong depends of size, shape, and stability on solvent. Figure shows the as-synthesized nanospheres in presence of n-octadecane, nanoplatelets in 1-octadecene, nano-spheres in octadecylamine and nanocacti with rod like features growing on the surface in OLA.

To control the size of transition metal chalcogenides ($Fe_3Se_4$), the reaction parameters are optimized to find suitable synthesis conditions to crystallize various sizes of $Fe_3Se_4$ compound by following the one-pot thermal decomposition method as shown in table 4 and the observed data shows that as the reaction temperature increases crystallite size also increases, table 5.

TABLE 4

Summary of the experimental conditions to control the size of the $Fe_3Se_4$ NPs.

| Reaction | Solvent | Fe precursor | Se precursor | Step 1 Temp. (° C.) | Step 1 Time (min) | Step 2 Temp. (° C.) | Step 2 Time (min) | Results |
|---|---|---|---|---|---|---|---|---|
| 1 | OLA | Fe(acac)$_3$ | Se powder | 120 | 30 | 260 | 120 | S1 |
| 2 | | | | | | 300 | 80 | S2 |
| 3 | | | | | | 330 | 70 | S3 |

Table 5 describes list of calculated crystallite size along different planes of all the as-synthesized $Fe_3Se_4$ NPs, indicating the influence of the temperature on the crystallite size of the products evolve out of solution chemistry.

TABLE 5

List of calculated crystallite size along different planes of all the as-synthesized $Fe_3Se_4$ NPs

| Sample | Crystallite size along following planes: d (±3 nm) | | |
|---|---|---|---|
| | (−112) | (202) | (204) |
| S1 | 33 | 25 | 22 |
| S2 | 37 | 31 | 24 |
| S3 | 42 | 35 | 26 |

Figure 11:
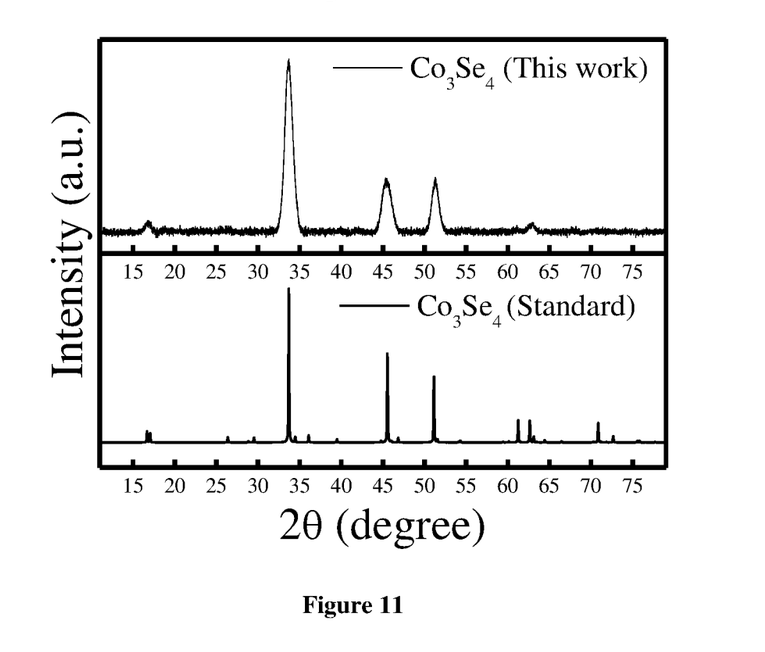
FIG. 11: XRD patterns of the as-synthesized $Co_3Se_4$ NPs.

FIG. 11 depicts XRD patterns of the as-synthesized $Co_3Se_4$ NPs. The XRD peaks are in good agreement with the 99989-ICSD (Inorganic Crystal Structure Database) data file without ambiguous reflections.

Figure 12:
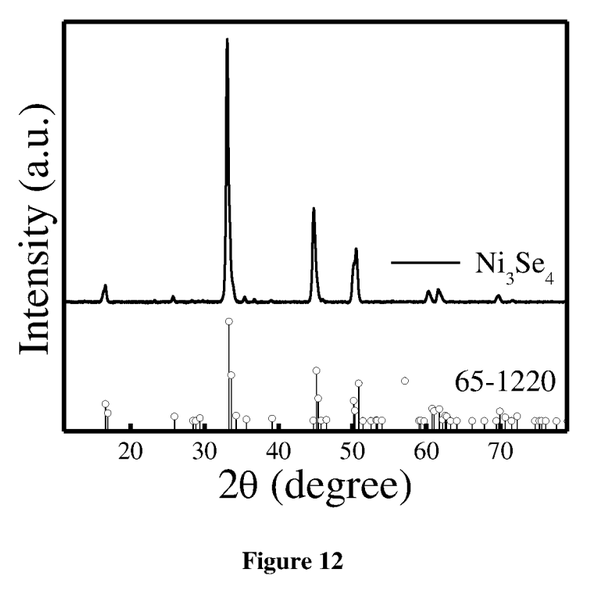
FIG. 12: XRD patterns of the as-synthesized $Ni_3Se_4$ NPs.

FIG. 12 depicts XRD patterns of the as-synthesized $Ni_3Se_4$ NPs. The XRD peaks are in good agreement with the JCPDS (Joint Committee on Powder Diffraction Standards) data files—(65-1220) without ambiguous reflections.

Figure 13:
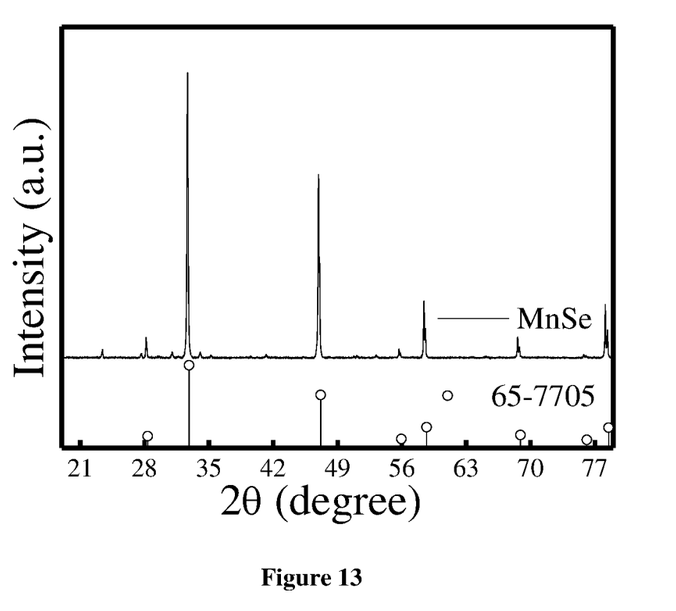
FIG. 13: XRD patterns of the as-synthesized MnSe NPs.

FIG. 13 depicts XRD patterns of the as-synthesized MnSe NPs. The XRD peaks are in good agreement with the JCPDS (Joint Committee on Powder Diffraction Standards) data files—(65-7705) without ambiguous reflections.

Figure 14:
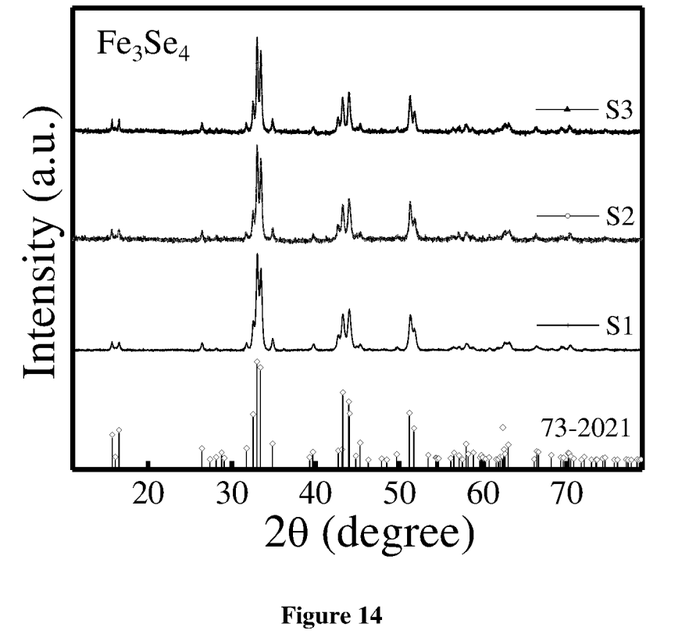
FIG. 14: XRD patterns of the as-synthesized $Fe_3Se_4$ NPs with different crystallite size.

FIG. 14 depicts XRD patterns of the as-synthesized $Fe_3Se_4$ NPs with different crystallite size. The XRD peaks are in good agreement with the JCPDS (Joint Committee on Powder Diffraction Standards) data files—(73-2021) without ambiguous reflections.

Figure 15:
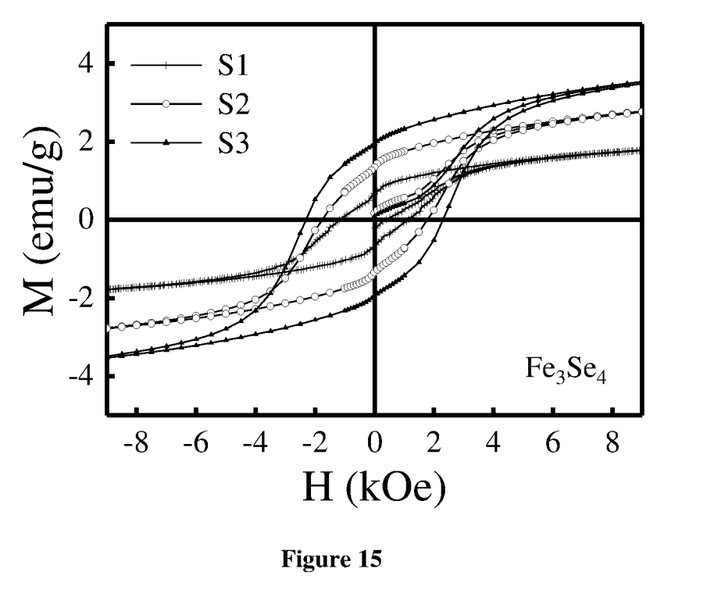
FIG. 15: Magnetization (M) vs. applied magnetic field (H) hysteresis loops of $Fe_3Se_4$ NPs with different crystallite size measured by the vibrating sample magnetometer at 300 K.

FIG. 15 depicts M-H hysteresis loops of 51, S2 and S3 of $Fe_3Se_4$ measured by the vibrating sample magnetometer at 300 K in an applied magnetic field up to ±60 kOe.

Figure 16:
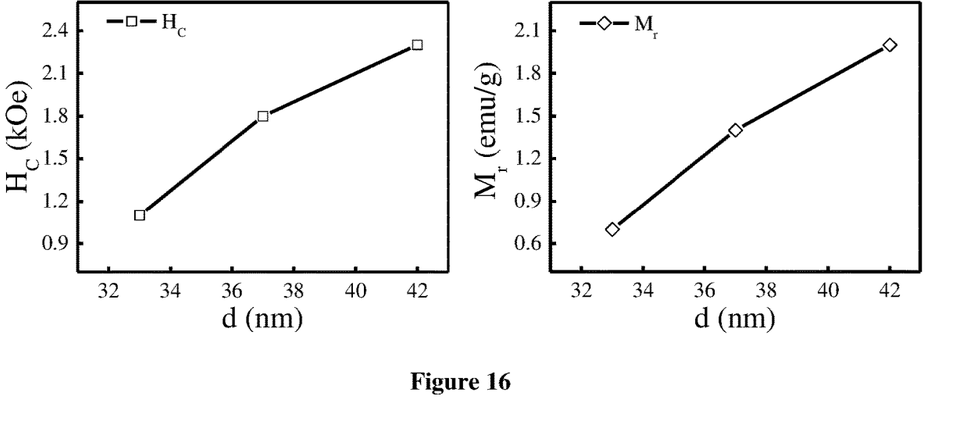
FIG. 16: Coercive field ($H_c$) and remanence magnetization ($M_r$) vs. crystallite size of $Fe_3Se_4$ NPs.

FIG. 16 depicts coercive field ($H_c$) vs crystallite size (left) and remanence magnetization ($M_r$) vs crystallite size (right) for $Fe_3Se_4$ NPs.

EXAMPLES

Following examples are given by way of illustration therefore should not be construed to limit the scope of the invention.

Example 1: Synthesis of the Fe—Se System to Examine the Phase Transformation

Synthesis of the Fe—Se System in OLA and 1-ODE. To study the effect of stoichiometry on the phase-transformation five prolonged reactions were performed by varying the amount of Se from 37.5 to 100 wt %, the stoichiometry of Fe/Se ranging from 1:0.75 (0.35 g, 0.059 g) to 1:2 (0.35 g, 0.158 g). All the reactions were carried out in the presence of 10 mL of 1-ODE and 15 mL of OLA in a 100 mL three-neck round-bottom (RB) flask under the blanket of nitrogen with constant magnetic stirring. The temperature was raised from 30 to 340° C. at a ramping rate of 2° C. min$^{-1}$. For every 10° C. rise in the temperature, hold-time was ~30 min. In each step, 2 mL aliquots were withdrawn using a long needle glass syringe to study the phase evolution. All the samples were stored in small glass vials and naturally quenched to RT for further investigation by wide-angle X-ray scattering (WAXS). The phase diagram was plotted after assembling the WAXS results, which inferred the effect of stoichiometry along with temperature on phase transformation of the Fe—Se system.

Example 2: Synthesis of the Fe—Se System in OLA

To study the effect of solvents on phase transformation one synthesis was done by following the same procedure as mentioned above except that only the OLA (15 mL) was used as an organic solvent with the stoichiometry of 1:1.

Example 3: Synthesis of the Fe—Se System in OLA and Predissolved Se Powder in 1-ODE In order to examine the effect of solvents, one more reaction was done with the same procedure as mentioned earlier except that the Se powder was predissolved in 1-ODE under a nitrogen environment with constant magnetic stirring at 30° C. for 6 h.

Example 4: Synthesis of $FeSe_2$ NPs

In a conventional reaction, 0.353 g (1 mmol) of Fe(acac)$_3$ and 0.158 g (2 mmol) of Se powders were added to 15 ml of OLA in a 100 mL three-neck round bottom (RB) flask. The mixture was stirred under a flow of high-purity nitrogen gas at 30° C. Then the temperature was raised to 150° C. at a ramping rate of 2° C. min$^{-1}$ and kept at 150° C. for 2 h. A thermometer was placed inside the RB-flask and the temperature was kept stable within ±1.0° C. during the 2 h long dwell-time at 150° C. The solution was cooled to RT by removing the heating source. After cooling, 20 ml of 2-propanol was added to the solution to give a black precipitate, which was separated from the solution by centrifugation. The obtained NPs were rewashed with the mixture of 15 ml hexane and 10 ml 2-propanol. Finally, the product was dried in a vacuum at 28° C. and utilized for further characterization.

Example 5: Synthesis of Fe$_3$Se$_4$ NPs

A 0.53 g (1.5 mmol) portion of Fe(acac)$_3$ and 0.158 g (2 mmol) of Se powder were mixed in 15 mL of OLA in a 100 mL three-neck RB flask. The mixture was heated to 120° C. and maintained for 30 min. Then, the temperature was raised at a heating rate of 2° C. min$^{-1}$ up to 200° C. and 5° C. min$^{-1}$ was used to reach a maximum temperature of 260° C.; at which the sample was maintained for 2 h.

Example 6: Synthesis of Fe$_7$Se$_8$ NPs

A 0.618 g (1.75 mmol) of Fe(acac)$_3$ and 0.158 g (2 mmol) of Se powder were added in 15 mL of OLA in a 100 mL three-neck RB flask. The mixture was heated to the designed temperature at a ramping rate of 5° C. min$^{-1}$ from 30° C. to 230° C. and then after ramping rate was decreased to 2° C. min$^{-1}$ up to 280° C., and kept for 4 h.

Example 7: Synthesis of FeSe NPs

This synthesis is similar to the synthesis of Fe$_7$Se$_8$ NPs with stoichiometry 1:1 except that the Se powder was pre-dissolved in 11 mL of 1-ODE at 30° C. with constant magnetic stirring for 6 h.

Example 8: Synthesis with Different Solvents

These syntheses are similar to the above synthesis except that 1-octadecene, octadecylamine and n-octadecane was used instead of OLA.

Example 9: Synthesis of Co$_3$Se$_4$ NPs

A 1.5 mmol portion of Cobalt(III) acetylacetonate (Co (acac)$_3$) and 2 mmol of Se powder were mixed in 15 mL of OLA in a 100 mL three-neck RB flask. The mixture was heated to 120° C. and maintained for 30 min. Then, the temperature was raised at a heating rate of 2° C. min$^{-1}$ up to 200° C. and 5° C. min$^{-1}$ was used to reach a maximum temperature of 300° C.; at which the sample was maintained for 2 h.

Example 10: Synthesis of Ni$_3$Se$_4$ NPs

A 1.5 mmol portion of Nickel(II) acetylacetonate (Ni (acac)$_2$) and 2 mmol of Se powder were mixed in 15 mL of OLA in a 100 mL three-neck RB flask. The mixture was heated to 120° C. and maintained for 30 min. Then, the temperature was raised at a heating rate of 2° C. min$^{-1}$ up to 200° C. and 5° C. min$^{-1}$ was used to reach a maximum temperature of 300° C.; at which the sample was maintained for 2 h.

Example 11: Synthesis of MnSe NPs

A 2 mmol portion of Manganese(III)acetylacetonate (Mn (acac)$_3$) and 2 mmol of Se powder were mixed in 15 mL of OLA in a 100 mL three-neck RB flask. The mixture was heated to 120° C. and maintained for 30 min. Then, the temperature was raised at a heating rate of 2° C. min$^{-1}$ up to 200° C. and 5° C. min$^{-1}$ was used to reach a maximum temperature of 300° C.; at which the sample was maintained for 2 h.

Advantages of the invention:
1. The present method is simpler and economical than solid state route and required relatively lower temperature.
2. This method is capable of giving high purity in phases and by this route it is easy to control the size, shape, and crystalline structure.
3. It is possible to control the size of NPs by varying the temperature with pertinent time as well as shape by changing the solvents.
4. This route is not only applicable for these 4 phases but also for other iron chalcogenide phases.
5. Various other transition metal chalcogenides consisting of metal atoms (Fe, Cr, Mn, Co, and Ni) and chalcogen atoms (S, Se, Te) can also be synthesized by this route after optimizing the reaction conditions (temperature, precursors, solvents).

The invention claimed is:
1. A one pot single phase process for the synthesis of a transition metal chalcogenide nanoparticle system having formula (I) by using wet chemical method, the process comprising:
mixing and stirring both a transition metal precursor and a chalcogen precursor at a temperature in a range of 25° C. to 30 C in the presence of a reducing agent and an accelerating agent under a blanket of an inert gas; followed by raising and maintaining the temperature in the range of 100-150° C. for a time period of 30 min and slowly increasing the temperature to 300° C. by heating at rate of 2°/min or 5° C./min or 10° C./30 min to obtain the transition metal chalcogenide nanoparticle system having formula (I),
wherein the formula (I) is represented as

$$A_x\text{-}B_y \qquad \qquad \text{Formula (I)}$$

wherein,
A is selected from the group consisting of iron, chromium, manganese, cobalt, and nickel;
B is selected from the group consisting of selenium, sulphur, and tellurium; and
A$_x$-B$_y$ is selected from the group consisting of AB$_2$, A$_3$B$_4$, A$_7$B$_8$ and AB;
wherein the ratio of x and y is from 1:2 to 1:1,
provided that when A is Fe and B is Se, then the system is not AB;
provided that the chalcogen precursor is Se powder.
2. The process as claimed in claim 1, wherein said system of formula (I) is selected from the group consisting of FeSe$_2$, Fe$_3$Se$_4$, Fe$_7$Se$_8$, Co$_3$Se$_4$, Ni$_3$Se$_4$ and MnSe.
3. The process as claimed in claim 1, wherein the size of as-synthesized transition metal chalcogenide nanoparticle is in the range of 5 nm to 350 nm.

4. The process as claimed in claim 1, wherein the shape of as-synthesized transition metal chalcogenide nanoparticle is selected from the group consisting of nano-rod, nano-sphere, nano-sheet, nano-platelet, nano-cube and mixed shape.

5. The process as claimed in claim 1, wherein the reducing agent is selected from the group consisting of oleylamine, oleic acid, 1-octadecene, octadecylamine, oleyl alcohol, pentylamine, ethylamine and n-octadecane.

6. The process as claimed in claim 1, wherein the accelerating agent is selected from the group consisting of 1-octadecene, oleic acid, oleylamine, octadecylamine, oleyl alcohol, pentylamine, and ethylamine.

7. The process as claimed in claim 1, wherein the transition metal precursor is selected from the group consisting of tris(acetylacetonato) iron (III), cobalt (III) acetylacetonate, nickel(II) acetylacetonate, and manganese(III)acetylacetonate.

8. A one pot single phase process for the synthesis of transition metal chalcogenides nanoparticles system wherein said system is Fe—Se system comprising the steps of:

a) mixing Se powder and $Fe(acac)_3$ at a temperature in the range of 25° C. to 30° C. in the presence of an organic solvent under the blanket of inert gas with constant magnetic stirring;

raising the temperature to 40° C. followed by stirring for 30 min and taking the first sample of only Se powder;

c) further increasing the temperature to 50° C. followed by stirring for 30 min and taking the second sample of only Se powder; and d) increasing the temperature up to 340° C. with the rate of 10° C./30 min and taking the sample at every 10° C. rise in temperature, as the temperature increases, wherein $FeSe_2$ starts forming followed by $Fe_3Se_4$, $Fe_7Se_8$ and FeSe.

9. The process as claimed in claim 8, wherein said organic solvent is selected from the group consisting of oleylamine; oleylamine and 1-octadecene; and oleylamine and pre-dissolved Se powder in 1-octadecene.

* * * * *